United States Patent [19]
Yoo

[11] Patent Number: 5,188,096
[45] Date of Patent: Feb. 23, 1993

[54] MASSAGE APPARATUS

[76] Inventor: Young-Yoon Yoo, 198 Nakwon-dong, Jongro-ku, Seoul 110-320, Rep. of Korea

[21] Appl. No.: 666,513

[22] Filed: Mar. 7, 1991

[30] Foreign Application Priority Data

Mar. 15, 1990 [KR] Rep. of Korea ............... 2977/1990
Feb. 23, 1991 [KR] Rep. of Korea ............... 2972/1991

[51] Int. Cl.$^5$ .............................................. A61H 1/00
[52] U.S. Cl. ....................................... 128/33; 128/36
[58] Field of Search ............................. 128/32–36, 128/45, 46, 24 R; 200/24

[56] References Cited

U.S. PATENT DOCUMENTS

| | | | |
|---|---|---|---|
| 2,924,216 | 2/1960 | Stewart | 128/33 |
| 2,943,620 | 2/1958 | Sibert | 128/24.1 |
| 3,446,204 | 5/1969 | Murphy | 128/33 |
| 3,632,911 | 1/1972 | Endou | 200/24 |
| 3,678,923 | 7/1972 | Oefinger | 128/33 |
| 3,885,554 | 5/1975 | Rockwell | 128/24 R |
| 4,157,088 | 6/1979 | Gracey | 128/33 |
| 4,371,815 | 2/1983 | Jones | 128/32 |
| 4,779,615 | 10/1988 | Frazier | 128/33 |
| 5,007,410 | 4/1991 | Delancy | 128/36 |

FOREIGN PATENT DOCUMENTS 328276 11/1987 Fed. Rep. of Germany ........ 128/32

Primary Examiner—Robert A. Hafer
Assistant Examiner—David J. Kenealy
Attorney, Agent, or Firm—Finnegan, Henderson, Farabow, Garrett and Dunner

[57] ABSTRACT

The massage apparatus includes a mat having massage cells arranged in each of several lateral and vertical rows and fixed onto the cloth to be vibrated individually and a control device of the massage cells, so as to change massaging area, its intensity and operating time.

6 Claims, 4 Drawing Sheets

FIG. 1
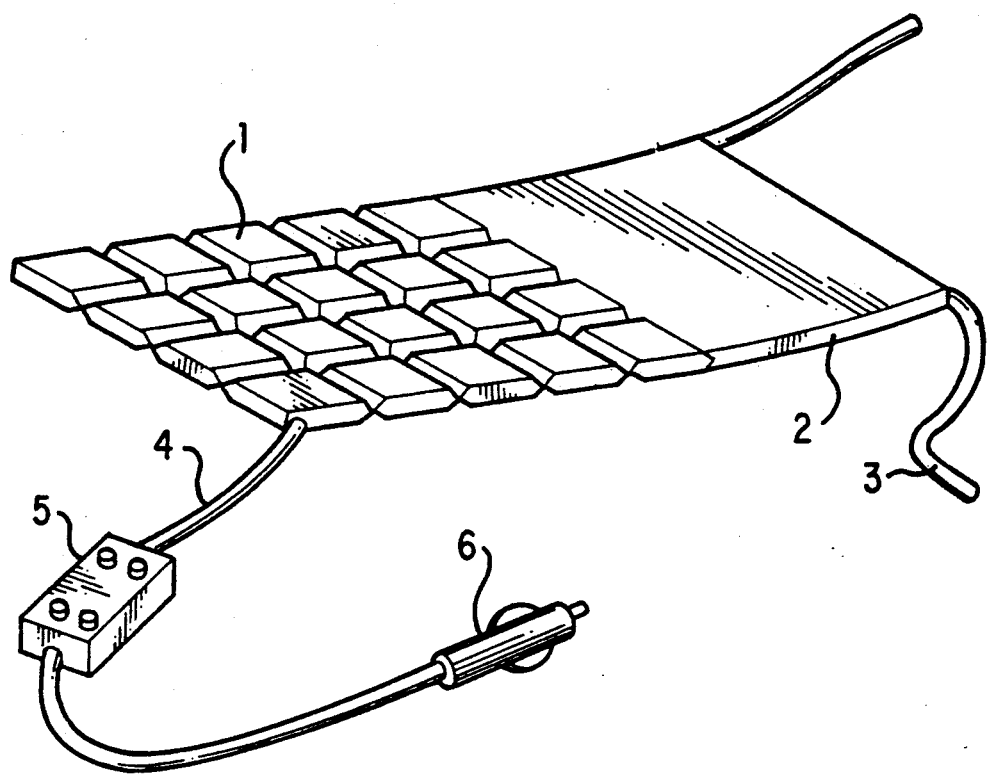
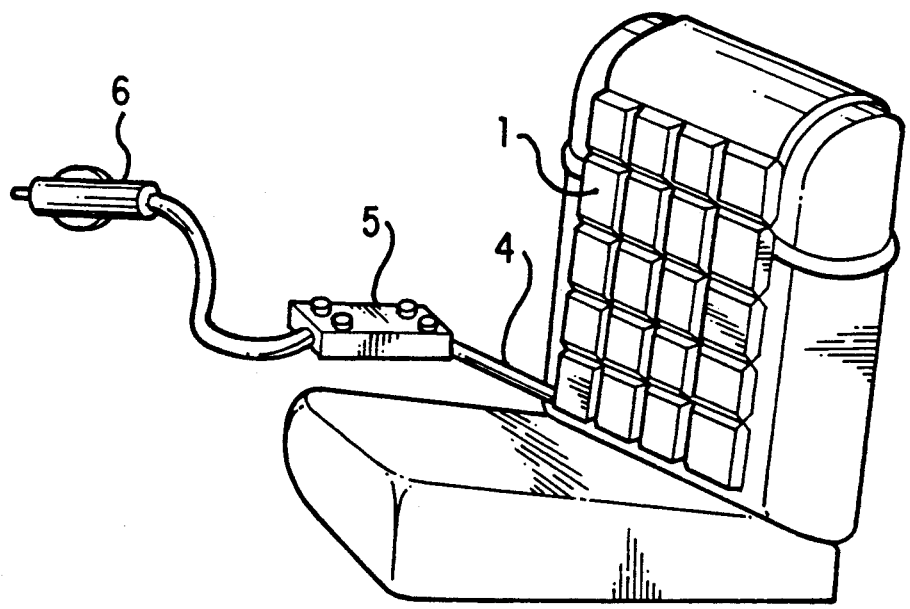
FIG. 2

MASSAGE APPARATUS

BACKGROUND OF THE INVENTION

The present invention relates to a massage apparatus for massaging the required part of the body for desired time with massage cells, controlled by a control unit, that is arranged and fixed in the fashion of a flat mat.

Ordinarily, a massage apparatus, or kneader, massages various parts of the human body while being moved back and forth, up and down by hand. Another is fitted onto the back of a chair and the person reclines on it or otherwise closely attaches his body to it and sets the kneader in operation so that it vibrates in its entirety, thus effecting the massage.

In the former case it is troublesome for a person to move the apparatus around to various loci. Not only that, it is also anything but satisfying because the massaged area is limited. In the latter case, it is possible to broaden the massaged area. But the massaged area is confined to the same fixed part, and the efficacy diminishes, gradually, as a person's sensitivity dulls in that part as time passes. Also, this has a shortcoming in that a person can not confine massaging to any single desired part of the body.

SUMMARY OF THE INVENTION

Therefore, the objective of the present invention is to provide a massage apparatus of which any desired part or parts, or else the whole, can be selectively set in motion in a designated sequence and for a desired length of time, whereby high massage efficiency is secured.

The aforementioned objective can be attained by a massage apparatus comprising a mat of a massage kneader having a plurality of massage cells and a control device for controlling the massage cells respectively; wherein the massage cells are arranged in each of several lateral and vertical rows, wrapped in cloth or synthetic leather, sewn together in the fashion of a flat board, having a support frame and a motor respectively, the motor fixed on an inner part of the support frame and provided with an eccentric weight attached to the shaft thereof.

According to a preferred embodiment of the present invention, the control device of the massage apparatus includes a timer circuit for controlling the time of power supply, a mode selection circuit for selecting a sequential operation mode or constant operation mode, a control signal generating circuit for generating signals according to the output signals of the timer circuit, the mode selection circuit, and a built-in program thereof, and a switching circuit for switching on/off the power supply of the massage cells.

According to another embodiment of the present invention, the control device of the massage apparatus includes a massage intensity control circuit for controlling the intensity of massage.

According to another embodiment of the present invention, the control device of the massage apparatus includes a rotor formed by joining alternately round insulating boards of certain thickness and round metal boards having a slightly smaller diameter than that of the round insulation board and having protrusions around their circumferences, a reduction motor of which the shaft is fixed on the center of the rotor, phosphor-bronze contact terminal sliding flexibly around a circumference of each round metal board and a phosphor-bronze contact terminal sliding flexibly on a side of the round metal board that is situated on the outermost location, wherein the phosphor-bronze contact terminal is connected to a terminal of a power supply and each of the phosphor-bronze contact terminals are connected to the massage cells.

With the massage apparatus of the present invention it is possible to change the massaging area as well as its intensity, as one desires, by just pressing buttons to choose control or power, time, operation modes, etc., to make the massage cells at desired locations or all of them operate, separately or in groups, for a desired length of time, after fixing the mat to a chair or to a seat in a vehicle; also, the massage apparatus of the present invention being in the form of a mat, its use is not overly dependent upon the shape of a seat, and so it can either be spread on a bed on which to lie down or rolled round an arm or a leg.

This and other objects, features, aspects and advantages of the present invention will become more apparent from the following detailed description of the present invention when taken in conjunction with the accompanying drawings.

BRIEF DESCRIPTION OF THE DRAWINGS

FIG. 1 illustrates a perspective view of a massage apparatus according to the present invention, FIG. 2 illustrates a perspective view of the massage apparatus installed on a chair.

DESCRIPTION OF THE PREFERRED EMBODIMENTS

Referring to FIG. 1, massage cells(1) are flexibly connected and arranged by desired number (for example, five by four) vertically and horizontally and covered with cloth or synthetic leather (2) at the upper and lower sides thereof, and the cloth or the synthetic leather (2) is joined by stitches between the cells to form a mat. Then massage cells (1) are connected to the control device (5) through a wire (4).

Figure 3:
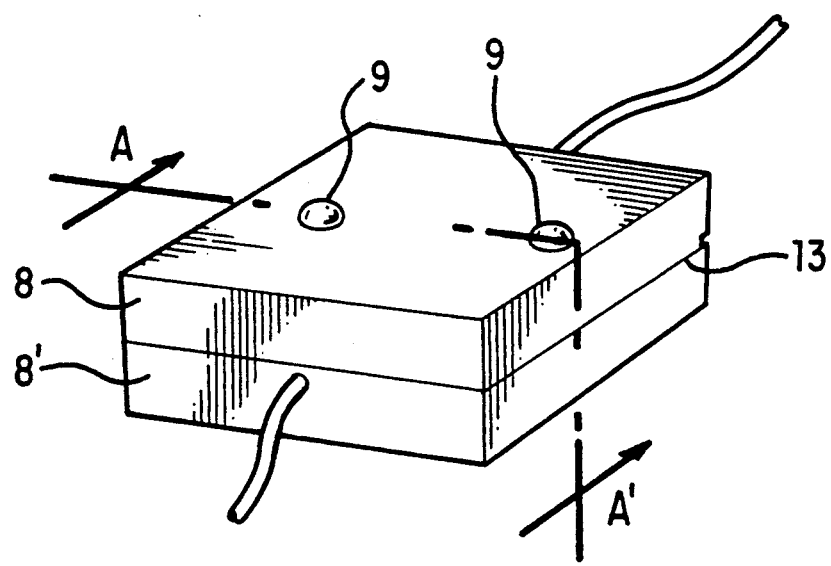
FIG. 3 is a perspective of a massage cell.
Figure 4:
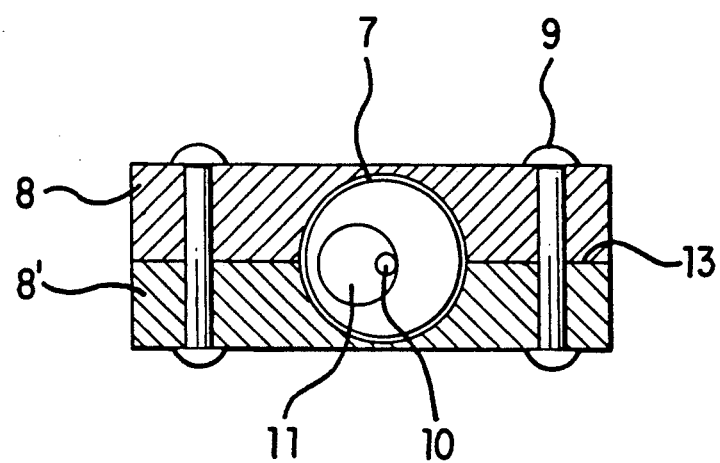
FIG. 4 is a sectional view taken along the lines A—A of FIG. 3.

Referring to FIG. 3 and FIG. 4, the massage cells (1) include two supporters (8, 8') which have a groove in the central part thereof, respectively, and are joined with a rivet (9), a motor which is installed on the groove of the supporters (8, 8') and has an eccentric weight (11) attached to the shaft of the motor (7), whereby the supporters are vibrated by the revolving of the eccentric weight (11).

Figure 5:
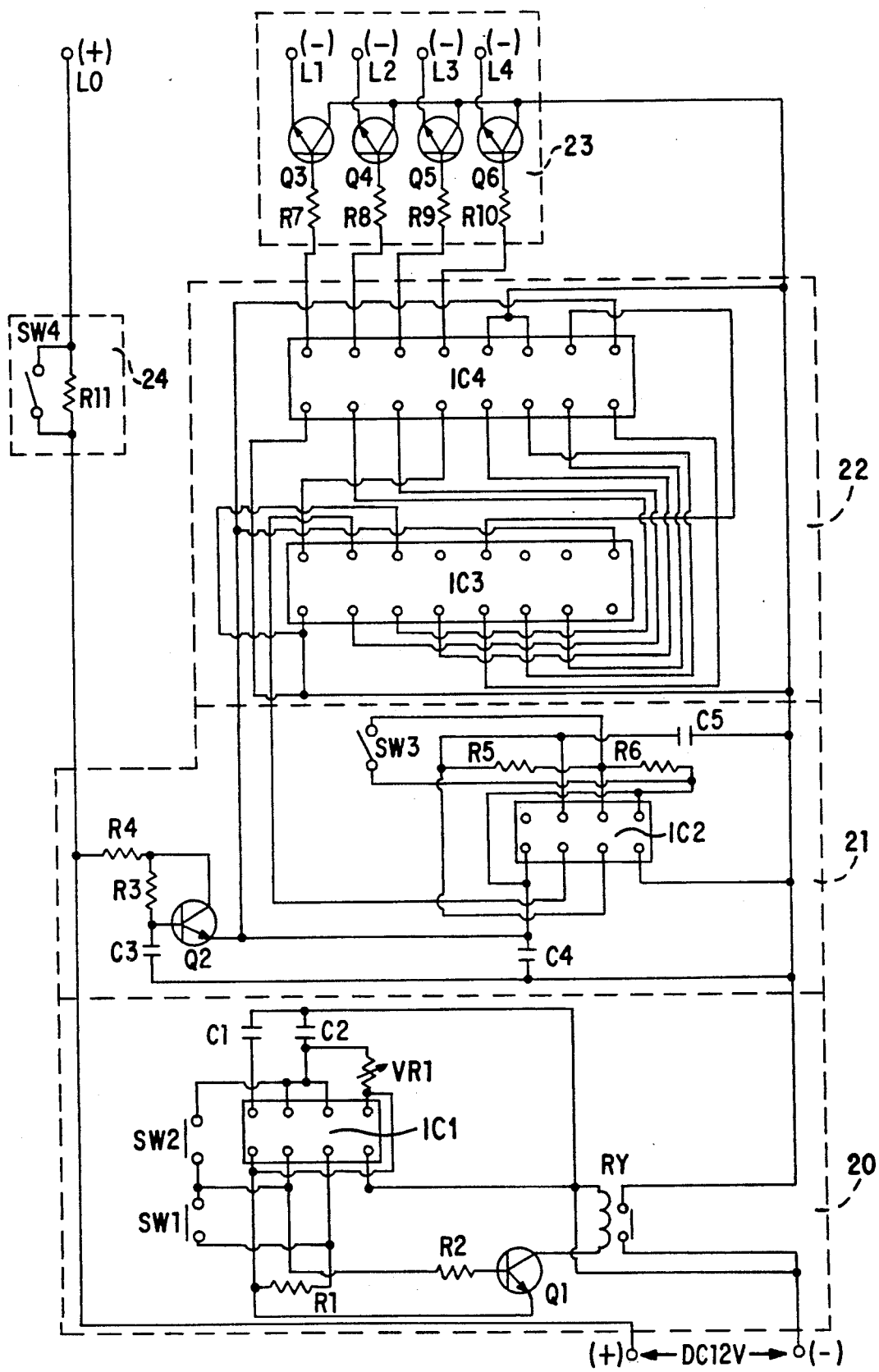
FIG. 5 is a schematic diagram of the control device of the present invention.

Referring to FIG. 5 shown as an embodiment of a control unit (5) of the present invention, the control unit (5) comprising a timer circuit (20) for setting the power supply time of the massage cells, a mode selection circuit (21) for selecting a sequential operation mode and a constant operation mode, a control signal generating circuit (22) for generating a control signal corresponding to the built-in program thereof and the output signal of the timer circuit (20), and the mode selection circuit (21), a switching circuit (23) for switching on/off the power supply of the massage cells.

The timer circuit (20) is a conventional IC timer and includes a timer IC (IC1), capacitors (C1, C2), resistors (R1, R2), a variable resistor (VR1), a transistor (Q1), relay (Ry), a push-button switch (SW1) for starting and a push-button (SW2) for stopping The mode selection circuit (21) includes an IC (IC2) for generating rectangular wave signals, an on/off switch (SW3) for selecting operation modes, resistors (R5, R6), and a capacitor (C5), and also includes an auxiliary supply power circuit having a transistor (Q2), resistors (R3, R4), and capacitors (C3, C4) in order to supply stabilized DC power.

The control signal generating circuit (22) includes a counter IC (IC3) as a 12-bit binary counter and a programmable ROM (IC4) having a built-in program. When the output signals of the counter IC (IC3) are provided to the programmable ROM (IC4), the signals are combined on the basis of the built-in program in the programmable ROM (IC4) in order to make various output signals of the programmable ROM (IC4). For example, the output of the programmable ROM (IC4) turns sequentially on each transistor (Q3–Q6) one by one, and, after a short period, all transistors (Q3–Q6) are simultaneously activated, the same process is repeated a number of times, and then the odd-numbered transistors turn, followed by the even-numbered ones, whereby the whole process is then continually repeated.

In addition, the switching circuits (23) are equipped with transistors (Q3–Q6) of which each base is connected to the output of programmable ROM (IC4), each collector is connected to a terminal of the DC power supply (minus (−) terminal), and each emitter is connected to each terminal of the motors which are (7) attached to the massage cells (1) through cables (L1–L4) respectively.

Furthermore, the massage intensity control circuit (24) is equipped with a resistor (R11) and a switch (SW4) of which the terminal is connected to a common terminal (plus(+) terminal) of each motor of the massage cells, another terminal is connected to the DC power supply for controlling the intensity of massaging, the reference number 3 is a rope for fixing the said mat, and 6 is a plug.

Operation of the massage apparatus of the present invention is described as follows:

When the push-button switch (SW1) is pressed, the relay (RY) is activated for the time (for example, 30 min) defined by the resistor value of the variable resistor (VR1) and the capacitor (C2), thereby, DC power supply is provided to each circuit of the control device (5), while the auxiliary supply power circuit (Q2, R3, R4, C3, C4) provides stabilized DC power to the mode selection circuit (21) and the control signal generating circuit (22).

When the switch (SW3) is off, the mode selection circuit (21) generates a series of rectangular wave signals having an interval (example, 3 sec.) defined by the value of the resistors (R5, R6) and the condenser (C5). But when the switch (SW3) is on, the mode selection circuit (21) stops generating the rectangular wave signals. Thereby, in cases where the switch (SW3) is off, the counter (IC3) of the control signal generating circuit (22) counts the number of the rectangular wave signals to generate a signal sequentially and repeatedly from each output terminals thereof.

Then the output signals of the binary counter (IC4) are sent to the programmable ROM (IC4) and the ROM (IC4) combines the received signals based on the built-in program in the ROM (IC4) and generates signals having the aforementioned various modes from four output terminals thereof.

Each transistor (Q3–Q6) of the switching circuit (23) is turned on or off according to the specific order and timing intervals based on the signals having various modes, which makes each of the massage cells divided into four groups vibrate according to the specific order and timing intervals.

When the on/off switch (SW3) of the mode selection circuit(21) is pressed during operation of the massage apparatus, any desired massage cells or whole massage cells vibrate For example, when the on/off switch (SW3) is pressed while any desired massage cells' being vibrated the mode selection circuit(21) stops generating rectangular wave signals, whereby the counter IC (IC3) of the control signal generating circuit(22) stops also counting thereof and the output signals of the ROM (IC4) hold the condition in which the on/off switch (SW3) is pressed. As a result, only the massage cells, being vibrated when the on/off switch (SW3) is pressed, hold the operating condition.

On the other hand, in case the on/off switch (SW3) is pressed while all the massage cells are vibrated, all the massage cells of the massage apparatus continue to vibrate simultaneously.

Although the timer circuit (20) sets the massage apparatus in operation during a set time, pressing the push button switch (SW2), the power supply of the massage apparatus is cut off to stop operation of the massage apparatus.

When the on/off switch (SW3) of the mode selection circuit (21) is pressed during operation of the massage apparatus, a desired massage cell or all massage cells are vibrated For example, when the on/off switch (SW3) is pressed while any desired massage cells' are vibrated, the mode selection circuit (21) stops generating rectangular wave signals, thereby the counter IC (IC3) of the control signal generating circuit (22) stops also counting the number of the rectangular wave signals, thereby to generate a signal from each output terminal thereof sequentially and repeatedly. Then, the output signals of the counter IC (IC3) are provided to the programmable ROM (IC4), the ROM (IC4) combines the received signals based on the built-in program in the ROM (IC4) and generates signals having the above-mentioned various modes from four output terminals thereof. Each transistor (Q3–Q6) of the switching circuit (23) is turned on or off according to the specific order and timing intervals based on the signals having various modes.

Besides, the intensity of massage can be controlled by using the on/off switch (SW4) of the massage intensity control circuit (24). When the switch (SW4) is on, the PC power supply (12 V) is provided to each motor of the massage cells without voltage drop of said power supply to make the speed of said motors increase, therefore, the intensity of massage gets strong due to the increase of the speed.

On the other hand, when the switch (SW4) is off, said power supply (12 V) is provided to said motors through the resister (R14) to make the speed of said motors decrease, thereby the intensity of massage gets weak.

Figure 6A:
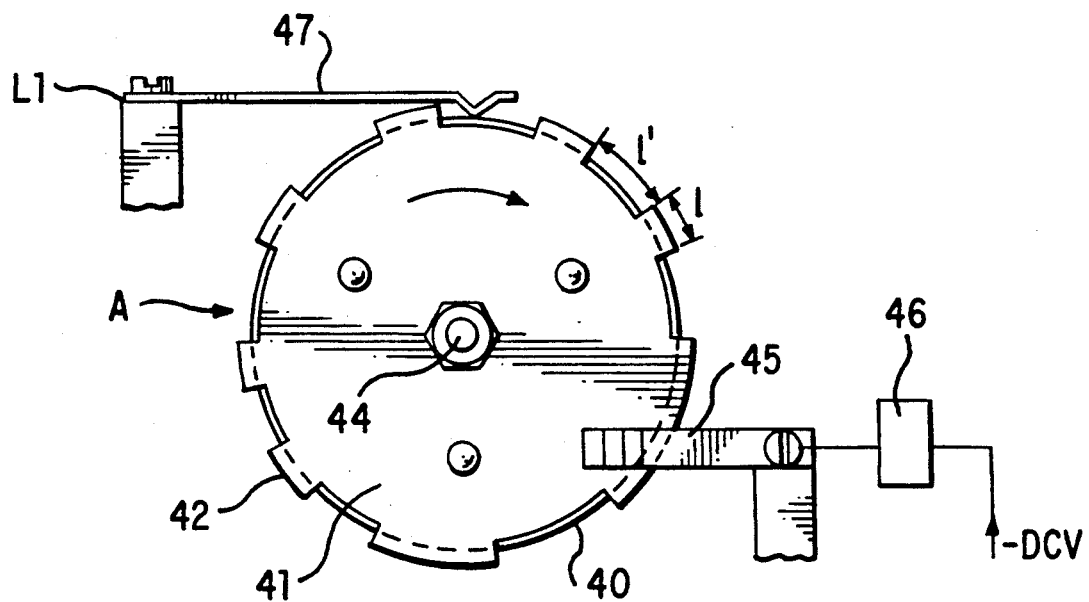
FIG. 6(A) and FIG. 6(B) illustrate another embodiment of the control device of the present invention.
Figure 6B:
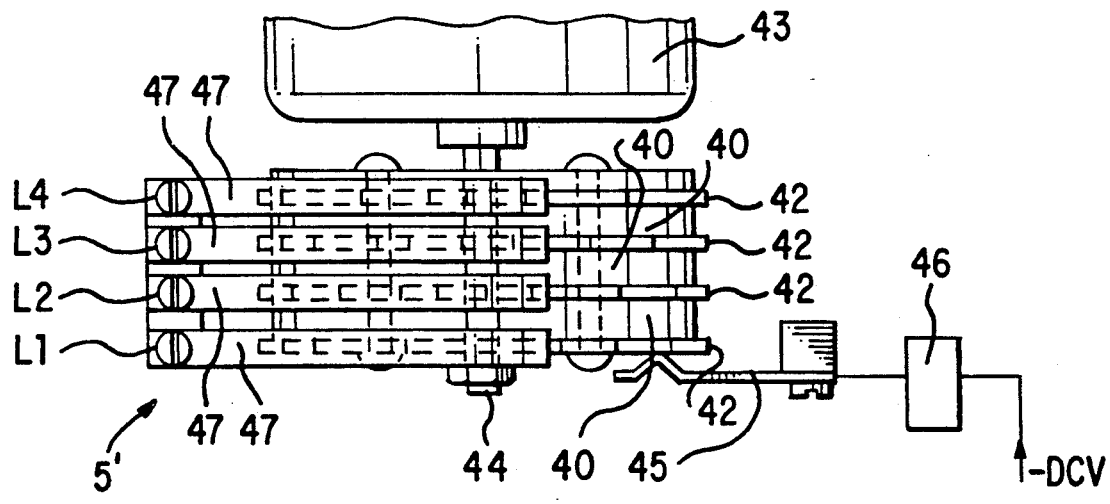

FIG. 6(A) and (B) show another embodiment of the control device. The control device (5) includes a rotor (A) formed by joining alternately round insulating boards (40) of certain thickness and round metal boards (41) having a slightly smaller diameter than that of the round insulation boards (41) and having protrusions (42) around circumferences of the round metal boards (41). The shaft (44) of a reduction motor (43) is fixed on the center of the rotor (A). Phosphorus bronze contact terminals (47) are contacted elastically around the circumference of each round metal board (41) and a part of each round insulating board (40) and a phosphorus-bronze contact terminal (45) is contacted elastically on the side of the round metal board (41) that is situated at the outer-most location.

The lengths (1) of each protrusion (42) and the intervals (1') between protrusion (42) are different from one another, and the round metal boards (41) placed between the round insulating boards (40) are electrically contacted with each other through the shaft (43) of the reduction motor (43) or the rivets for joining the boards (40,41).

Also, the another side of the phosphorus-bronze contact terminal (47), as the first embodiment, is connected to each group of the massage cells (1) divided into four groups.

In the massage apparatus according to the second embodiment, when the rotor (A) is rotated by the reduction motor (43), each phosphorus-bronze contact terminal (47) slides elastically on a part of each round insulating board (40) and round metal board (41).

In case each terminal (47) comes into electrical contact with a protrusion (42) of the round metal board (41) placed between two of round insulating boards (40), each of the phosphorus-bronze contact terminal (47) is contacted electrically to the phosphorus-bronze contact terminal (45) through the round metal board (47) or the round metal board (47) and the shaft (44), thereby DC power is supplied to the massage cells (1) through said terminals (45, 47) and cables (L1-L4) to make the massage cells (1) operate.

On the other hand, when the terminal (47) is free from the protrusion (43), said operation stops because the terminal (47) is separated from the round metal board (41).

Accordingly, if the lengths (1) of the protrusion (42), the intervals (1') between these protrusions (42) and the arrangement of the protrusions (42) on the circumferences of the metal board (41) are combined, it is possible to attain various output signals so that each massage cell of the massage apparatus may be driven in various modes as in the first embodiment.

While there has been described what is at present considered to be the preferred embodiment of the present inventions, it will be understood that various modification may be made therein, and it is intended to cover in the appended claims all such modifications as fall within the true spirit and scope of the present invention.

For example, in said embodiments, the output of the control device (5, 5') is proceeded by four signals only, but they may be increased according to need.

In addition, in said embodiments, the massage cells are divided into four groups and each of the four groups is controlled corresponding to each output of the control device (5, 5'), but each massage cell may be controlled corresponding to each output of the control device (5, 5').

What is claimed is:

1. A massage apparatus, comprising:
   a massage mat including a plurality of flexibly connected massage cells arranged in an array of adjoining horizontal and vertical rows, said massage cells each having supporter means for defining an interior massage cell cavity, a motor fixed in said cavity, and an eccentric weight drivable by said motor for vibrating said massage cells when the motor is operated; and
   control means for regulating the vibration of said massage cells, including:
      a rotor formed by alternately joining a plurality of round insulating boards having a certain thickness and a plurality of round metal boards having a slightly smaller diameter than said round insulating boards, said round metal boards having a plurality of protrusions of differing lengths around their circumferences, said protrusions spaced around the circumferences of the metal boards at varying intervals,
      a reduction motor having a shaft affixed to the center of the rotor,
      a plurality of first contact terminals mounted to the control means to slide flexibly around the circumference of each round metal board and a part of each round insulating board and electrically connected to the massage cells, and
      a second contact terminal mounted to the control means to slide flexibly on a side of the outermost round metal board of said rotor, said contact terminal electrically connected to a terminal of a power supply.

2. The massage apparatus of claim 1, wherein said control means further comprises means for controlling the time of power supply to said massage cells.

3. The massage apparatus of claim 1, wherein said control means further comprises means for selecting one of a sequential operation mode and a constant operation mode.

4. The massage apparatus of claim 1, wherein said control means further comprises means for switching on/off the power supply of said massage cells.

5. The massage apparatus of claim 1, wherein said control means further comprises means for controlling the vibrating intensity of said massage cells.

6. The massage apparatus of claim 1, wherein said plurality of massage cells are encased in a fabric cover which is sewn together.

* * * * *